US007591726B2

(12) United States Patent
Baerlocher et al.

(10) Patent No.: US 7,591,726 B2
(45) Date of Patent: Sep. 22, 2009

(54) GAMING DEVICE HAVING DISCOUNTED ACTIVATIONS OR WAGERS

(75) Inventors: Anthony J. Baerlocher, Reno, NV (US); Karen M. Cregan, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 505 days.

(21) Appl. No.: 10/227,052

(22) Filed: Aug. 22, 2002

(65) Prior Publication Data

US 2004/0063492 A1 Apr. 1, 2004

(51) Int. Cl.
*A63F 13/00* (2006.01)
*A63F 9/24* (2006.01)

(52) U.S. Cl. .............................. 463/25; 463/20; 463/29; 463/42

(58) Field of Classification Search ............. 463/16–22, 463/25, 29, 40–42; 273/138.1–2, 143 R
See application file for complete search history.

(56) References Cited

U.S. PATENT DOCUMENTS 4,669,731 A 6/1987 Clarke
4,695,053 A 9/1987 Vazquez, Jr. et al.
5,397,125 A 3/1995 Adams
5,511,781 A 4/1996 Wood et al.
5,647,798 A * 7/1997 Falciglia ...................... 463/19
5,823,874 A 10/1998 Adams
5,971,849 A * 10/1999 Falciglia ...................... 463/16
5,993,316 A 11/1999 Coyle et al.
6,062,980 A 5/2000 Luciano
6,102,400 A 8/2000 Scott et al.
6,110,041 A 8/2000 Walker et al.
6,126,542 A 10/2000 Fier
6,155,925 A 12/2000 Giobbi et al.
6,158,741 A 12/2000 Koelling
6,159,095 A * 12/2000 Frohm et al. .................. 463/19
6,159,097 A 12/2000 Gura
6,174,233 B1 1/2001 Sunaga et al.
6,174,235 B1 1/2001 Walker et al.
6,203,427 B1 * 3/2001 Walker et al. ................. 463/16
6,203,429 B1 3/2001 Demar et al.
6,224,482 B1 5/2001 Bennett
6,224,483 B1 5/2001 Mayeroff (Continued)

FOREIGN PATENT DOCUMENTS

GB 2201279 A * 8/1988

(Continued)

OTHER PUBLICATIONS

Jazzy Jackpots Advertisement written by Atronic Americas, published in Mar. 2001.

(Continued)

*Primary Examiner*—John M. Hotaling
*Assistant Examiner*—Ryan Hsu
(74) *Attorney, Agent, or Firm*—K&L Gates LLP

(57) ABSTRACT

An apparatus and method for operating a wagering gaming device that enables a player to accept a discounted game element when a triggering event occurs during a primary wagering game. The discounted game element includes may be a discounted reinitiation of the primary wagering game or a discounted component or function of the primary wagering game.

59 Claims, 12 Drawing Sheets

U.S. PATENT DOCUMENTS

| | | | | |
|---|---|---|---|---|
| 6,227,969 | B1 | 5/2001 | Yoseloff | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,244,957 | B1 | 6/2001 | Walker et al. | |
| 6,254,482 | B1 | 7/2001 | Walker et al. | |
| 6,270,409 | B1 | 8/2001 | Shuster | |
| 6,293,865 | B1 * | 9/2001 | Kelly et al. | 463/16 |
| 6,299,165 | B1 | 10/2001 | Nagano | |
| 6,306,035 | B1 | 10/2001 | Kelly et al. | |
| 6,309,299 | B1 | 10/2001 | Weiss | |
| 6,312,334 | B1 * | 11/2001 | Yoseloff | 463/25 |
| 6,315,662 | B1 | 11/2001 | Jorasch et al. | |
| 6,319,125 | B1 * | 11/2001 | Acres | 463/25 |
| 6,443,452 | B1 * | 9/2002 | Brune | 273/143 R |
| 6,491,584 | B2 | 12/2002 | Graham et al. | |
| 6,565,434 | B1 * | 5/2003 | Acres | 463/25 |
| 7,066,387 | B2 * | 6/2006 | Itoh et al. | 235/382 |
| 7,329,182 | B2 | 2/2008 | Adams et al. | |
| 2002/0143619 | A1 * | 10/2002 | Laurie | 705/14 |
| 2003/0003983 | A1 * | 1/2003 | Walker et al. | 463/16 |
| 2003/0032476 | A1 * | 2/2003 | Walker et al. | 463/25 |

FOREIGN PATENT DOCUMENTS

| | | | |
|---|---|---|---|
| WO | WO 99/38133 | * | 7/1999 |

OTHER PUBLICATIONS

- Black Swan Advertisement written by IGT, published by prior to 2001.
- Austin Powers Poker Advertisement written by IGT, published in 2001.
- Beat The Slots Join the Slot Club, www.iplayslots.com, printed May 1, 2003.
- Bright Ideas Cash Back by Andrew MacDonald, www.urbino.net, printed May 1, 2003.
- Paris Las Vegas Advertisement, www.parkplace.com, available prior to 2002.
- The One Club Advertisement, www.myoneclub.com, available prior to 2002.
- Tropicana Winners Club Advertisement, www.tropicanalv.com, available prior to 2002.
- Venetian Players Club Advertisement, www.venetian.com, available prior to 2002.
- Video Poker, written by Bob Dancer, www. casinogaming.com, published Oct. 9, 2001.
- Video Poker Review.com, printed May 15, 2003.

* cited by examiner

GAMING DEVICE HAVING DISCOUNTED ACTIVATIONS OR WAGERS

BACKGROUND OF THE INVENTION

The present invention relates in general to a gaming device, and more particularly to a gaming device having discounted activations or wagers.

Base or primary wagering games such as slot machines, video poker machines, blackjack machines, and keno machines are well-known. Typically, these machines employ a credit system, wherein one credit is equal to the listed monetary denomination of the machine. For example, one credit is equal to one dollar on a dollar machine. Thus, a player inserts money into the machine and receives the corresponding number of credits.

A player can bet one credit per game played. Alternatively, a player can bet more than one credit per game up to a maximum number of credits wagered per game. Awards that the player receives during game play are sometimes based on the number of credits wagered. In such games, betting a larger number of credits results in larger awards. Generally, in such gaming machines, the maximum award can only be obtained if the player is betting the maximum number of credits per game.

In certain wagering games, a player can place multiple wagers. For example, a player may be able to bet on multiple paylines during a slot game. As another example, a player may be able to bet on multiple hands during a game of video poker or blackjack. Generally, a player can bet one credit per hand or payline up to a maximum number of credits wagered per hand or payline. Again, betting a larger number of credits results in larger awards and the maximum award can only be obtained if a player is wagering the maximum number of credits per hand or payline.

Certain wagering games award one or more free activations of the primary game to a player upon the occurrence of a triggering event. Typically, the triggering event is a predetermined symbol or a combination of symbols. For instance, a player may be awarded free spins upon the occurrence of a triggering event in a slot game. Alternatively, a player may be awarded one or more free activations of a secondary or bonus game upon the occurrence of a triggering event. In either case, the free activations are automatically awarded to the player upon the occurrence of the triggering event. It should also be appreciated that the player does not wager any additional credits during the free activations.

It is desirable to provide players with new and different wagering gaming devices with new and different activation schemes for the enjoyment and entertainment of the players.

SUMMARY OF THE INVENTION

The present invention provides an apparatus and method for operating a wagering gaming device. Specifically, the present invention provides a gaming device that enables a player to accept an offer of a discounted game element upon the occurrence of a triggering event. A game element includes a primary game and any suitable components or functions of the primary game, such as a payline in a slot game or a hand or a card in a poker or blackjack game. The gaming device of the present invention includes any suitable primary game such as slot, poker, keno or blackjack. The triggering event occurs randomly or periodically in the primary game or in a secondary game. For example, the triggering event could be a symbol on a reel in a slot game or a symbol on a card in a poker game or a blackjack game. Upon the occurrence of the triggering event, the gaming device offers the discounted game element to the player. If a player accepts the offer, the gaming device activates the discounted game element.

In one embodiment, the discounted game element offered to the player is at least one discounted activation or reinitiation of the primary game. The activations are discounted in that the gaming device offers each reinitiation of the primary game for a wager that is less than the amount the player is currently wagering on the primary game. For example, if the player is wagering one credit on the primary game, the gaming device may offer the player five reinitiations of the primary game for only four total credits. Thus, in the above described example, the player would be considered to be wagering one credit per primary game for award purposes. However, less than one credit would be subtracted from the player's balance per primary game played (i.e., only four total credits wagered to play five primary games).

In the embodiment described above, the player is offered at least one reinitiation of the primary game for a wager that is less than the amount the player is currently wagering on the primary game. However, it should be appreciated that in alternative embodiments, the gaming device may offer the player discounted activations of at least one primary game wherein the wagered amount is more or less than the amount the player is currently wagering on the primary game. For example, if the player is wagering one credit on the primary game, the gaming device may offer the player one reinitiation of a two credit primary game for only one credit. Thus, the player is considered to be wagering two credits for award purposes, but only one credit is subtracted from the player's balance.

In another embodiment, the discounted game element is any suitable component of the primary game. For example, the discounted game element could be a discounted payline in a slot game, a discounted hand in a poker or blackjack game or a discounted card in a keno game. It should be appreciated that the player may be offered more than one discounted component up to a maximum number of discounted components available in the primary game.

Generally, discounted components would be applied to at least one future primary game. For example, assuming that a player is wagering two credits on only one payline in a slot game, the gaming device may offer the player an additional discounted payline for a wager of only one credit. The additional discounted payline would to be applied to at least one future game. Thus, in the above described example, the player would be considered to be wagering four credits for award purposes (i.e., two on each payline). However, only three credits would be subtracted from the player's balance (i.e., two credits for the original payline and one credit for the discounted payline). It should be appreciated that in alternative embodiments, a discounted component could be offered for use in an ongoing primary game rather than a future game.

In another embodiment, the present invention provides a method for operating a gaming device. The method includes a number of steps for offering and initiating a discounted game element. The discounted game element includes a primary game or secondary game and any suitable components of the primary game or the secondary game, such as a payline in a slot game or a hand in a poker game. The method begins by initiating a first game. In one embodiment, the first game is a primary game and in an alternative embodiment, the first game is a secondary or bonus game. The method continues by offering at least one discounted game element upon the occurrence of a triggering event in the first game. Subsequently, the gaming device initiates the discounted game element if the discounted game element offer is accepted.

In a further alternative embodiment of the present invention, the gaming device provides a plurality of options or offers to the player upon the occurrence of the triggering event. In one such embodiment, the player is provided an offer to accept a number of credits as a win (or award) or to play a discounted game which employs such credits as all or part of the wager in discounted game. Thus, the present invention could be implemented through an offer/acceptance game.

In a further embodiment of the present invention, the gaming device provides a discounted game to the player upon the occurrence of a triggering event associated with the primary game which includes the player making a wager on the game which is at a predetermined level such as the maximum wager possible on the primary game. The discount is provided by not charging the player credits at the predetermined level or charging the player the predetermined amount and returning or crediting the player the amount of the discount, or part or component of the player's wager.

It is therefore an advantage of the present invention to provide a gaming device and method for its operation, which offers discounted activations and wagers upon the occurrence of a triggering event.

Additional features and advantages of the present invention are described in, and will be apparent from, the following Detailed Description of the Invention and the Figures.

DETAILED DESCRIPTION OF THE INVENTION

Gaming Device and Electronics

Figure 1A:
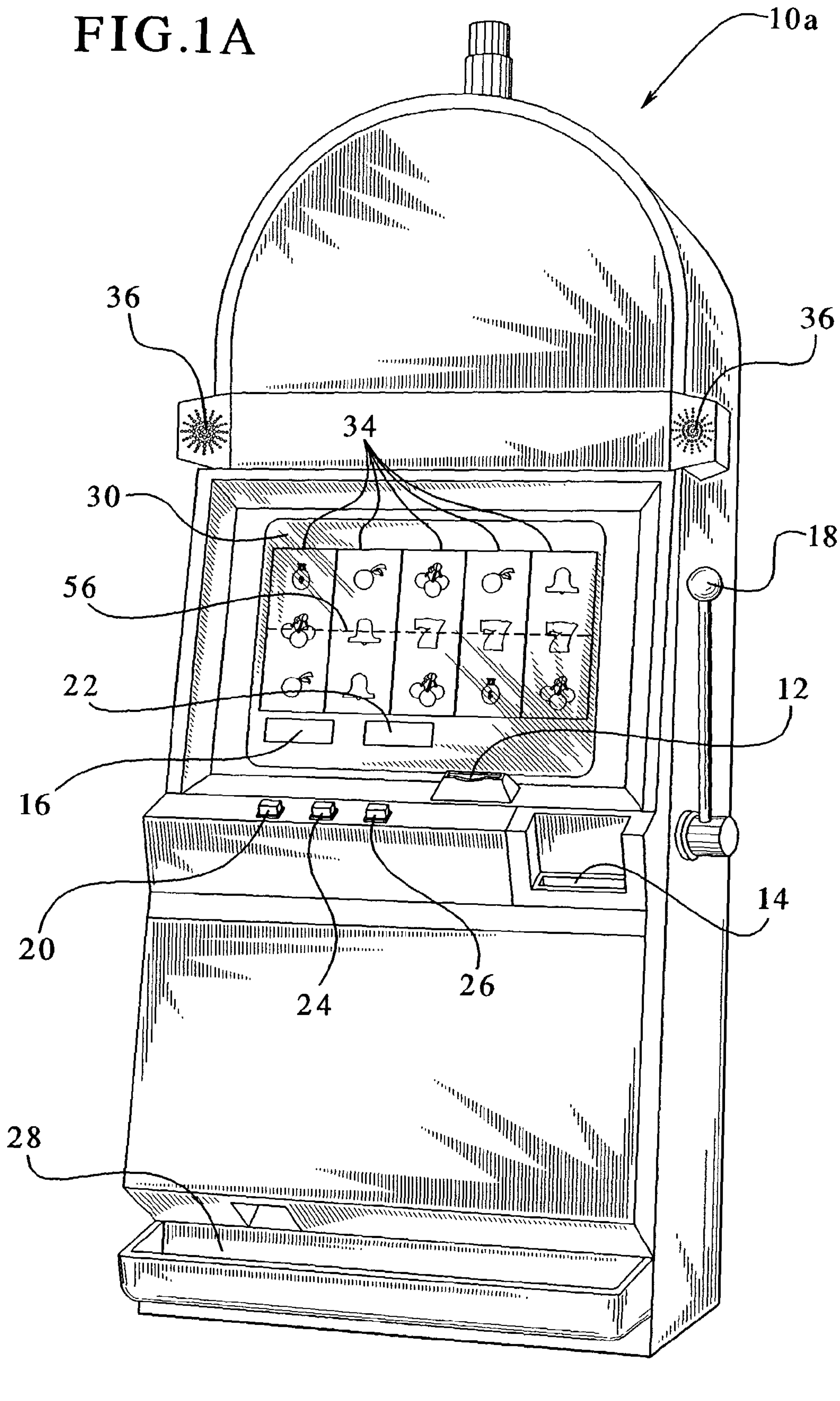
FIGS. 1A and 1B are perspective views of alternative embodiments of the gaming device of the present invention.
Figure 1B:
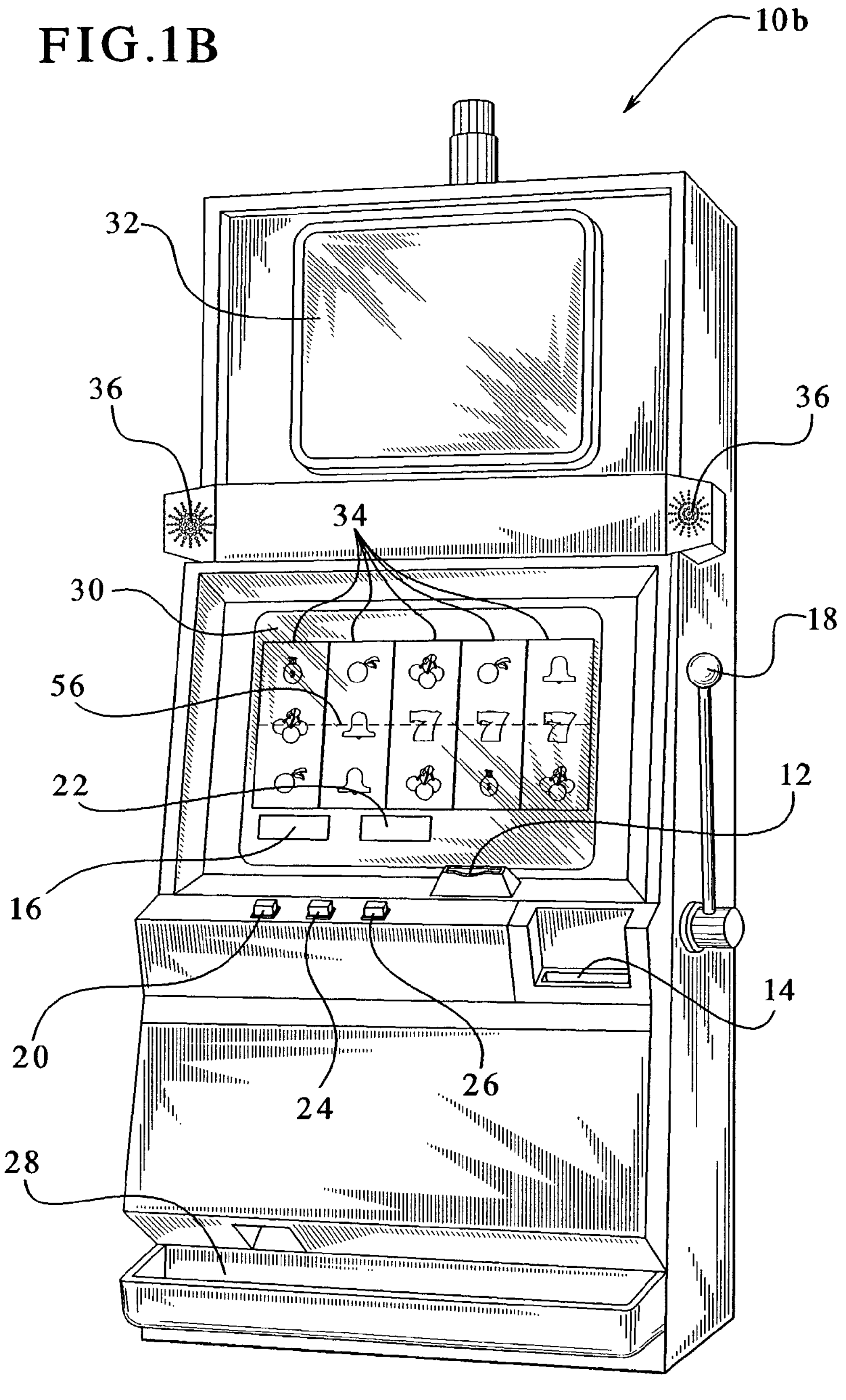

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards, debit cards, or smart cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device could also include a conventional bet max button.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards (i.e. smart cards) which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
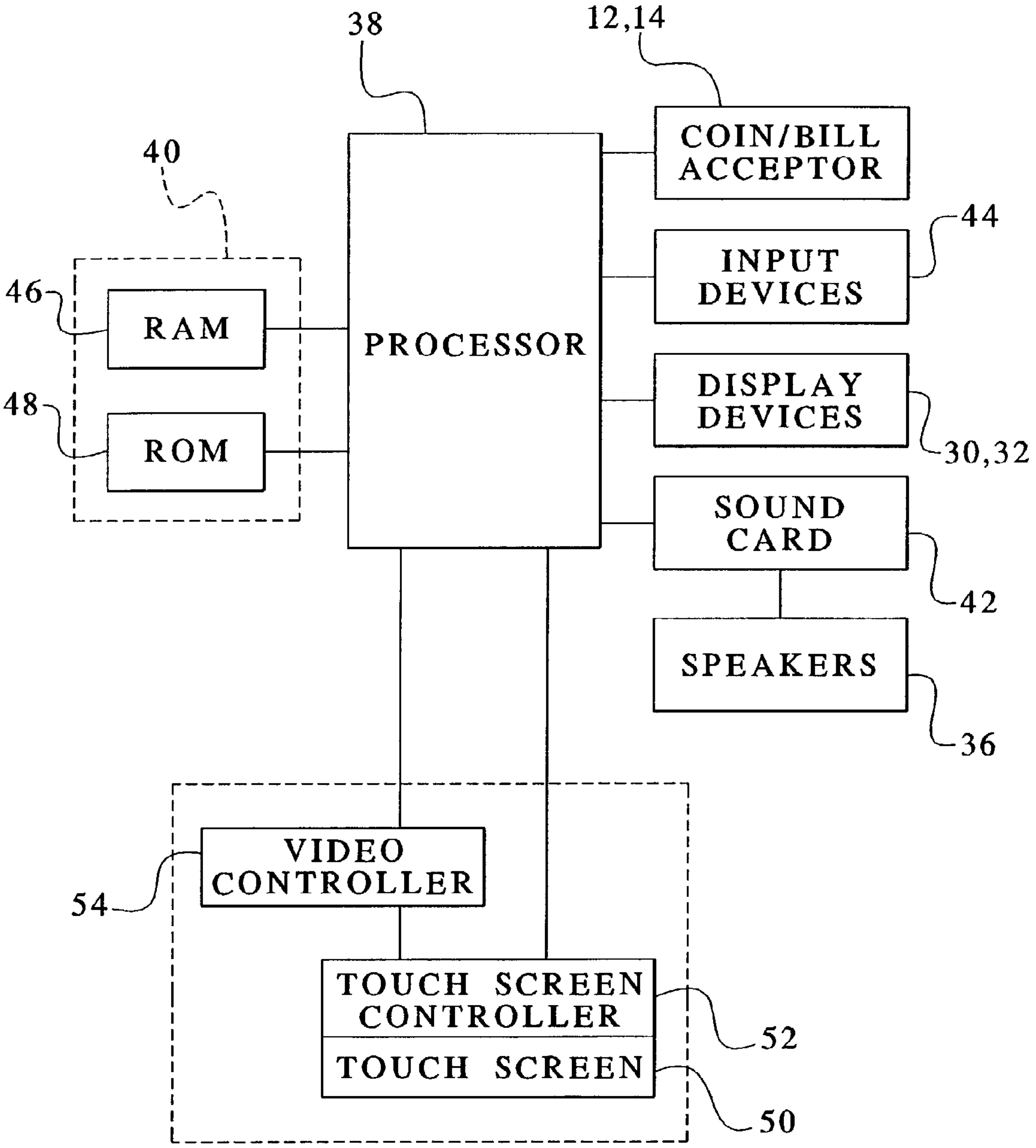
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Discounted Activations or Wagers

Figure 3A:
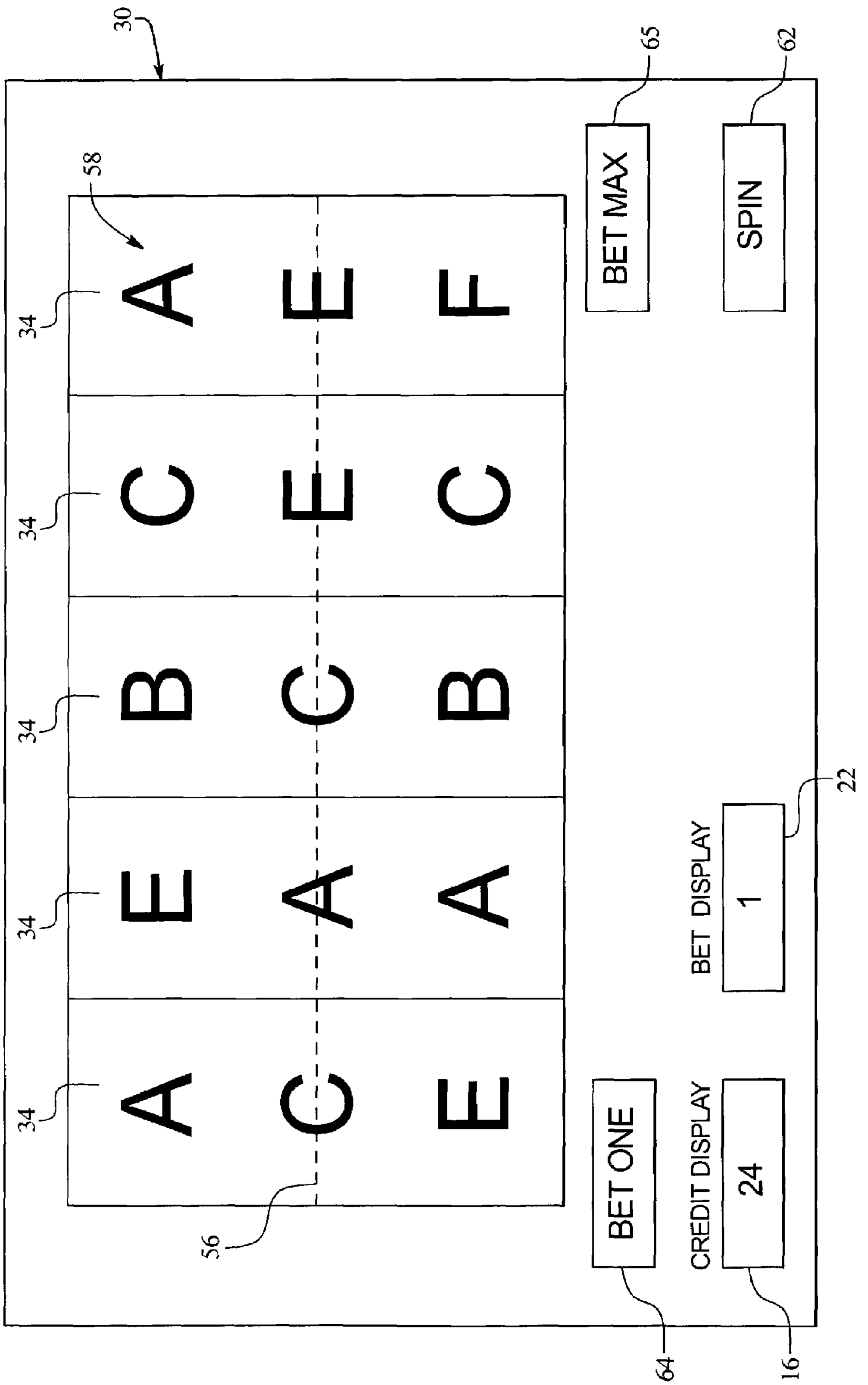
FIGS. 3A to 3D are enlarged front elevation views of one of the display devices of FIGS. 1A and 1B illustrating embodiments of a slot game having discounted activations or wagers.

Referring now to FIG. 3A, a central display device 30 generally illustrates one embodiment of the present invention. The central display device 30 preferably is a touch screen display device. The game in this embodiment is a slot game. The slot game in this embodiment includes a set of video reels 34 having a plurality of symbols 58 on each reel 34. Further, the slot game includes at least one payline, for example, horizontal payline 56. The paylines in a slot game may include any adjacent horizontal, diagonal or combination of horizontal and diagonal symbol positions. Horizontal payline 56 is illustrated here for the sake of illustration. The payline 56 in this embodiment includes five symbol positions.

A player may bet or wager any suitable number of credits up to a maximum number of credits. The player must bet at least one credit. The player places a bet by pressing bet one button 64. The current number of credits being wagered is reflected in bet display 22. The player increases the bet by one credit each time the bet one button 64 is pressed. Thus, when the player pushes the bet one button 64, the number of credits shown in credit display 16 decreases by one, and the number of credits shown in the bet display 22 increases by one. The player can bet the maximum number of credits by pressing bet max button 65. The player in this embodiment is betting one credit as shown in the bet display 22.

The video reels 34 in this embodiment randomly display symbols 58 for each symbol position on the video reels 34. The player activates or spins the video reels 34 by, for example, pressing spin button 62. Alternatively, pressing the bet max button 65 or the play button (not shown) could activate the video reels 34. When the video reels 34 have come to rest, payline 56 is analyzed to determine whether a winning combination has been produced.

Figure 3B:
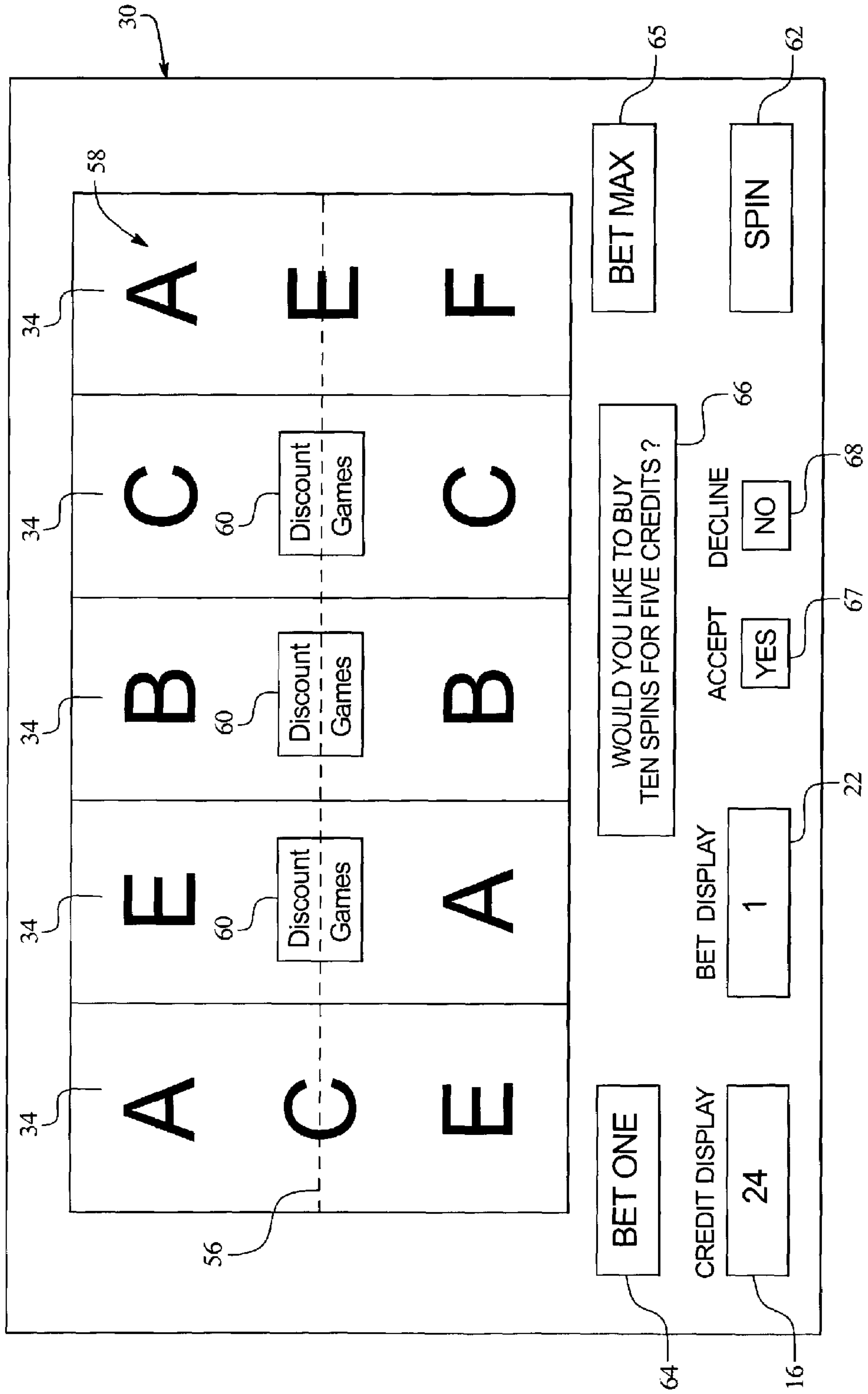

Referring now to FIG. 3B, a winning combination triggering a discounted game element according to an embodiment is shown. In this embodiment, the winning combination is the occurrence of the three discounted games symbols 60 along payline 56. The discounted game element in this embodiment is the primary game, that is, at least one discounted activation or reinitiation of the primary game. Thus, the triggering event for the discounted activations of the primary game in this embodiment is the occurrence of three discounted games symbols 60 along payline 56.

In this embodiment, three symbols trigger the discounted activations, but it should be appreciated that any predetermined combination and/or number of symbols can act as the triggering event. Furthermore, it should be appreciated that in one preferred embodiment, the triggering event could occur along any of the paylines on which the player is wagering. In this embodiment, the triggering event must occur along payline 56 because that is the only active payline.

Upon the occurrence of the triggering event, the player is offered a chance to purchase discounted activations of the primary game. In this embodiment, the player is wagering one credit for one spin of the reels, as shown in bet display 22. However, it should be appreciated that the player could wager any suitable number of credits per spin of the reels. As shown in offer window 66, the player is offered the chance to purchase ten discounted spins for only five credits. Thus, the player has the option to keep wagering one credit per spin but need only pay one-half credit per spin (i.e., five credits divided by ten spins). However, the player must affirmatively accept the offer by, for example, pressing yes indicator or button 67.

If the player accepts the offer, the ten discounted spins are then provided to the player. Thus, the player realizes a savings of one-half credit per spin, that is, the player has essentially purchased each spin for one-half credit. Alternatively, the player can choose to decline the offer by pressing no indicator or button 68. If the player declines the offer, game play will proceed as before, for example, with the player having the ability to wager a suitable number of credits on each spin, as shown in FIG. 3A.

In this embodiment, the player is offered ten spins for five credits. However, it should be noted that the player could be offered the opportunity to purchase any number of discounted spins for any number of discounted credits. For instance, the player might be offered five spins for four credits or twenty spins for fifteen credits. Furthermore, in this embodiment, credits are used as the wagering unit. As described above, a credit is merely a symbolic wagering unit and it should be noted that any suitable type of wager may be used. For example, a player may wager using a smart card, actual currency, or the wager may be tied to a concurrent winning amount. Thus, a player might be offered five spins for $4.80 (rather than $5.00) and the player could have the wager amount deducted from a smart card or a debit account, the player could insert the appropriate currency into the gaming device or the player could have the amount deducted from concurrent winnings.

In this embodiment, the player has the opportunity to purchase discounted activations of the primary game for a wager that is less than the amount the player is currently wagering on the primary game. In an alternative embodiment, the player is presented with the opportunity to purchase discounted activations where the wagered amount is more than the amount the player is currently wagering on the primary game.

Figure 3C:
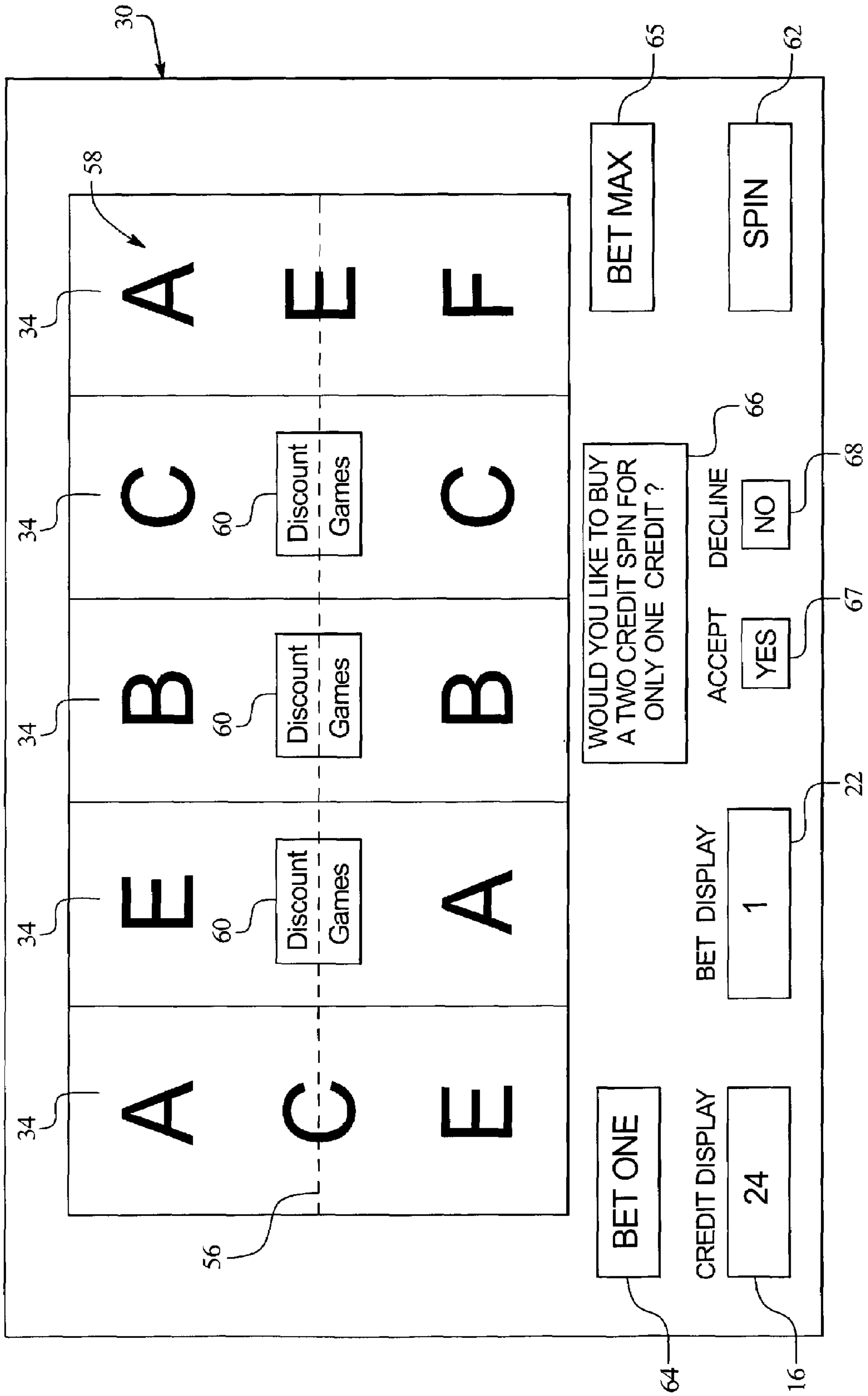

As shown in FIG. 3C, the bet display 22 indicates that the player is currently wagering one credit on the game. However, a winning combination of discounted games symbols 60 has been produced along payline 56. Accordingly, the player is presented with the opportunity to purchase a discounted activation of the primary game. Offer window 66 indicates that the player may wager two credits on the primary game for the cost of only one credit. The player must affirmatively accept the offer by pressing the yes button 67. If the player accepts the offer, the player receives a two credit wager on the primary game, but only has to pay a discounted rate of one credit for the activation of the primary game.

Alternatively, the player can choose to decline the offer by pressing no button 68. If the player declines the offer, game play will proceed as before, for example, with the player having the ability to wager a suitable number of credits on each spin, as shown in FIG. 3A.

In the above-described embodiments, the discounted game element was a reinitiation of the entire primary game. In alternative embodiments, the discounted game element is any suitable component of the primary game. In one embodiment, the discounted game element is at least one discounted payline in a slot game. In FIG. 3A, the player is wagering one credit on payline 56 in the primary game. The player spins the video reels 34 by pressing the spin button 62. When the video reels 34 come to rest, payline 56 is analyzed to determine whether a winning combination has been produced.

Figure 3D:
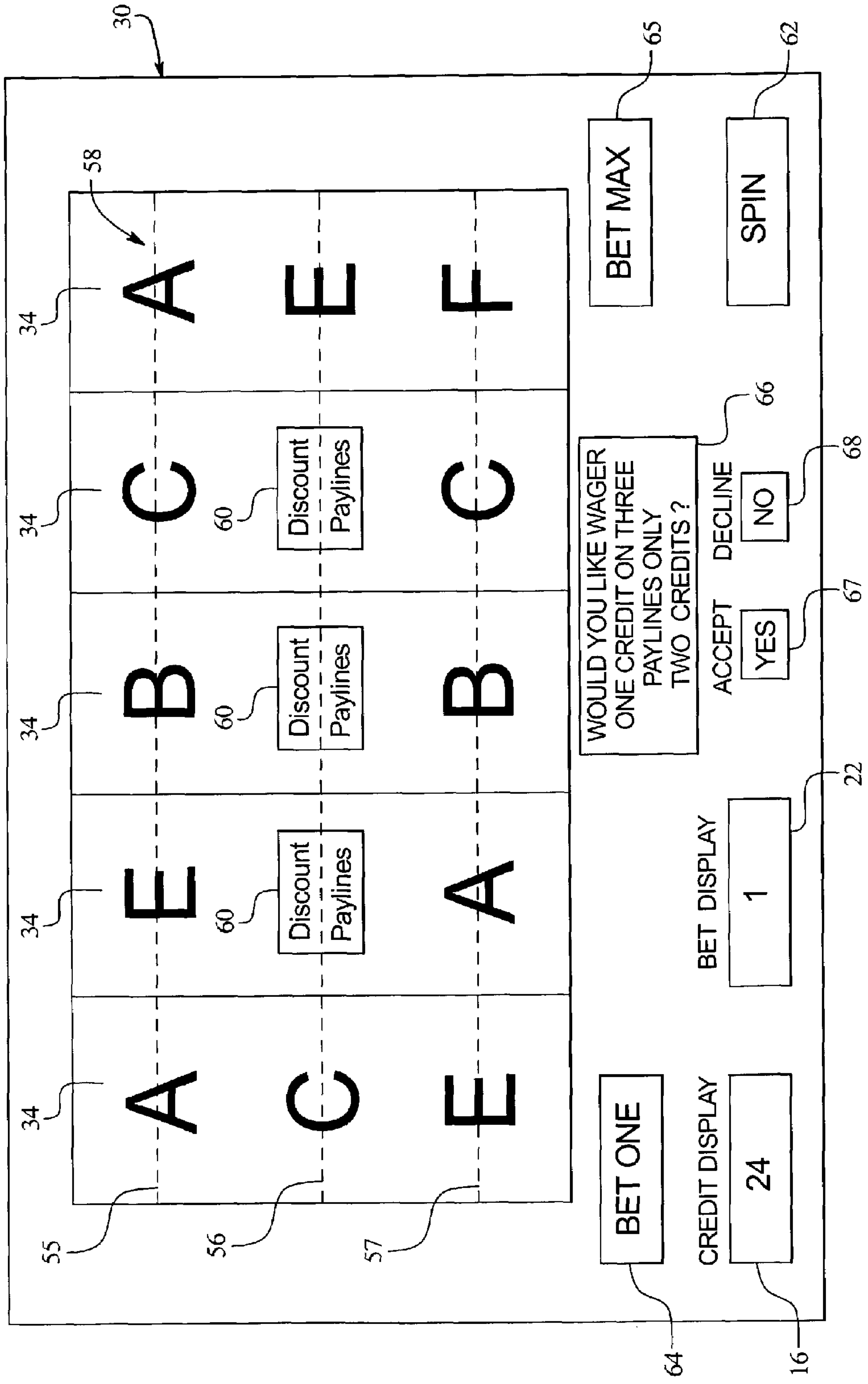

Referring now to FIG. 3D, discount paylines symbols 60 along payline 56 signal that a winning combination has been produced. Accordingly, the player is presented with the opportunity to purchase at least one discounted game element. In this embodiment, the player has the chance to purchase discounted paylines, that is, discounted wagers on paylines 55, 56 and 57 as indicated by offer window 66. The player must affirmatively accept the offer by pressing the yes button or indicator 67. If the player accepts the offer, the player receives a one credit wager on each of the paylines 55, 56 and 57, but only two total credits are subtracted from the player's remaining balance which is shown in credit display 16. Alternatively, the player can choose to decline the offer by pressing no button or indicator 68. If the player declines the offer, game play will proceed as described above with reference to FIG. 3A.

In this embodiment, the player has the opportunity to activate two discounted paylines 55 and 57. However, it should be appreciated that the player could be offered the chance to activate any suitable number of discounted paylines. For example, the player could be offered the chance to wager one credit on each of five paylines for only four total credits. Alternatively, the player could be offered the chance to choose the number of discounted paylines to activate. In further alternative embodiments, the player may even be offered an increased wager on the discounted paylines. For example, a player wagering one credit on a payline might be offered the chance to wager three credits on three paylines for a total cost of only five credits.

It should also be appreciated that in alternative embodiments, several alternatives may be presented to the player for their selection. For instance, the player might be offered five discounted game elements for four credits, ten discounted game elements for seven credits or fifteen discounted game elements for ten credits. Thus, the player would have the ability to select the number of the discounted game elements that they would like to purchase. Further, the discount could be increased, as in the above example, when a larger number of discounted game elements are offered.

In the above described embodiment, the discounted game element was a payline in a slot game. It should be appreciated that in alternative embodiments, the discounted game element could be any suitable component in the primary game. For example, the discounted game element could be a discounted hand in a poker or blackjack game or a discounted number in a keno game. It should also be appreciated that the player may be offered more than one discounted component up to a maximum number of discounted components available in the primary game.

It should be noted that the primary game is not limited to slots. The primary game could be any suitable primary game such as keno, blackjack or poker. Referring now to FIG. 4, a central display device 30 generally illustrates one embodiment of the present invention where the primary game is video poker. Bet display 22 indicates that the player is currently wagering one credit on each video poker game. However, a player may bet or wager any suitable number of credits up to a maximum number of credits. The player must bet at least one credit. The player places a bet by pressing bet one button 64. The player increases the bet by one credit each time the bet one button 64 is pressed. Thus, when the player pushes the bet one button 64, the number of credits shown in credit display 16 decreases by one, and the number of credits shown in the bet display 22 increases by one. The player can bet the maximum number of credits by pressing bet max button 65.

The video poker game in this embodiment includes a number of cards 70. Predetermined combinations of the cards 70 result in winning combinations. The payoff for a winning combination is tied to the number of credits the player is wagering. The player must wager the maximum amount of credits to achieve the maximum payoff. In this embodiment, the player is wagering the minimum amount of one credit.

Figure 4A:
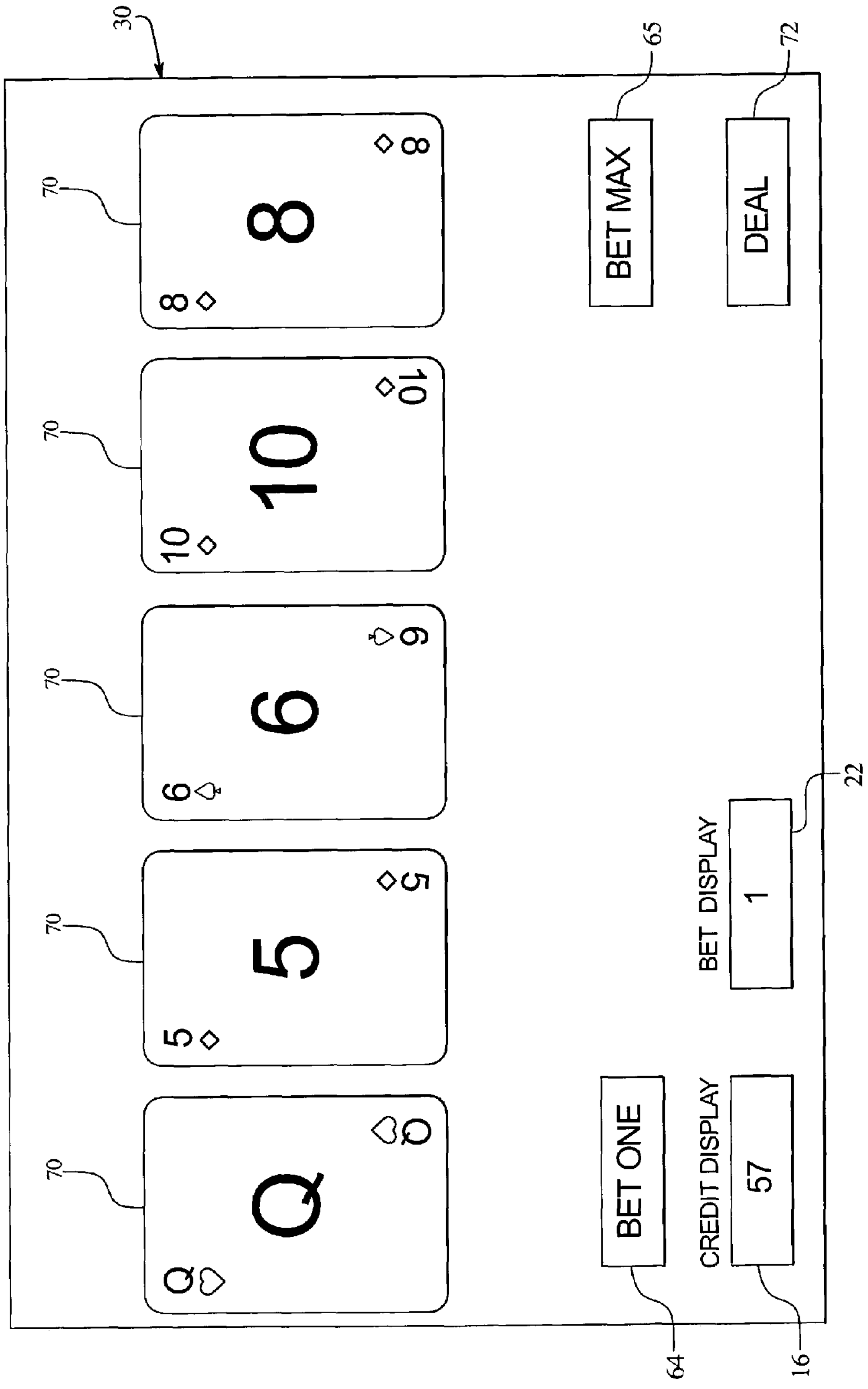
FIGS. 4A to 4D are enlarged front elevation views of one of the display devices of FIGS. 1A and 1B illustrating embodiments of a poker game having discounted activations or wagers.
Figure 4B:
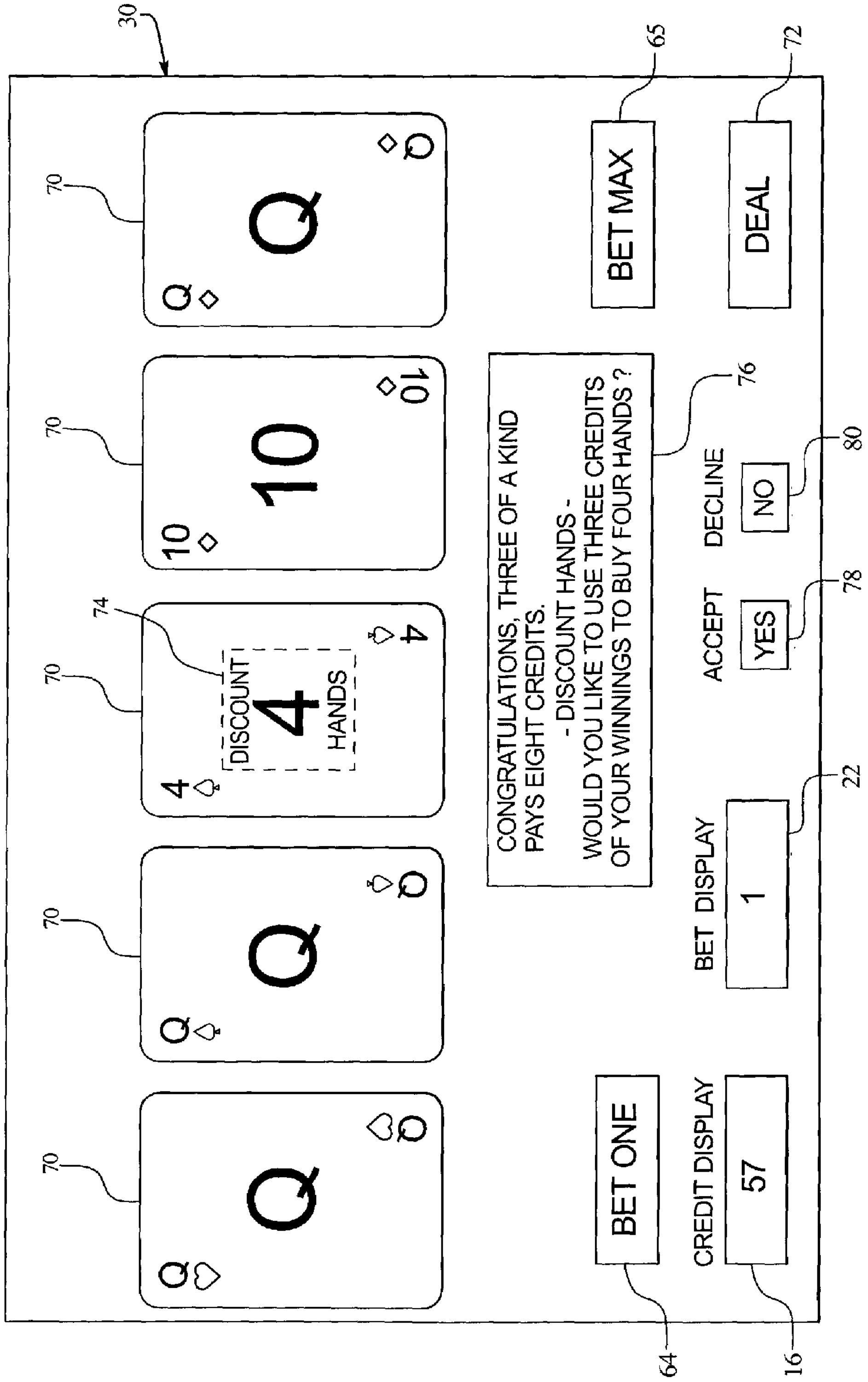

To start the video poker game, the player presses the deal button 72. After pressing the deal button, the player will be presented with a new hand of cards 70. If a winning combination is produced, the player receives the corresponding payoff. FIG. 4B shows an embodiment where the player has received a winning combination. Three of the cards 70 are a queen, meaning that the player has received a three of kind. In this embodiment, status window 76 indicates that a three of kind pays eight credits for a one credit wager.

In addition to the three of a kind, a triggering event for a discounted game element was also produced. The triggering event in this embodiment is discount hands symbol 74. Thus, the player has the chance to purchase a discounted game element. In this embodiment, the discounted game element is at least one discounted video poker hand. In this embodiment, the number of discounted hands offered to the player depends on the card associated with the discount hands symbol 74. Since the discount hands symbol 74 appeared on the card 70 having the number four, the player is offered four discounted hands for three credits as shown in status window 76.

Figure 4C:
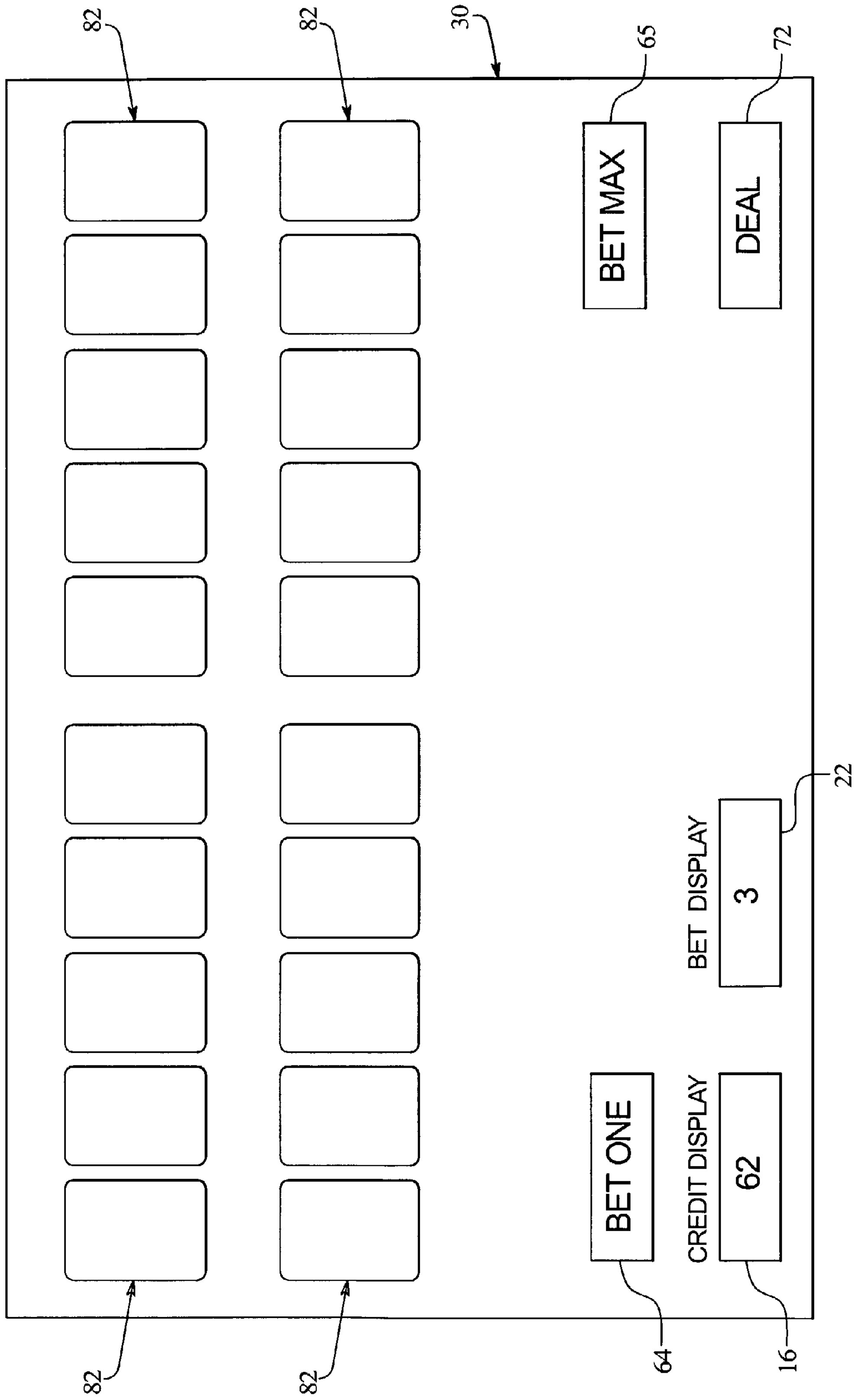

In this embodiment, the player has the ability to deduct the cost for the discounted hands from the player's concurrent winnings. Thus, the player can deduct the three credits for the four discounted hands from the eight credits that were won on this hand for the three of a kind. The player must press the yes indicator or button 78 to accept the discounted hands offer. If the player decides to accept the discounted hands offer, then in one embodiment, the player plays a multi-hand video poker game as shown in FIG. 4C. The hands could alternatively be provided sequentially instead of concurrently.

In this embodiment, the multi-hand video poker game includes the four discounted hands 82. The hands are discounted in that the player is wagering one credit one each hand as shown by bet display 22, but only paid or tendered a total of three credits. The three credits were paid out of the player's eight winning credits. Thus, the five remaining winning credits are added to the player's remaining balance as shown by credit display 16.

Figure 4D:
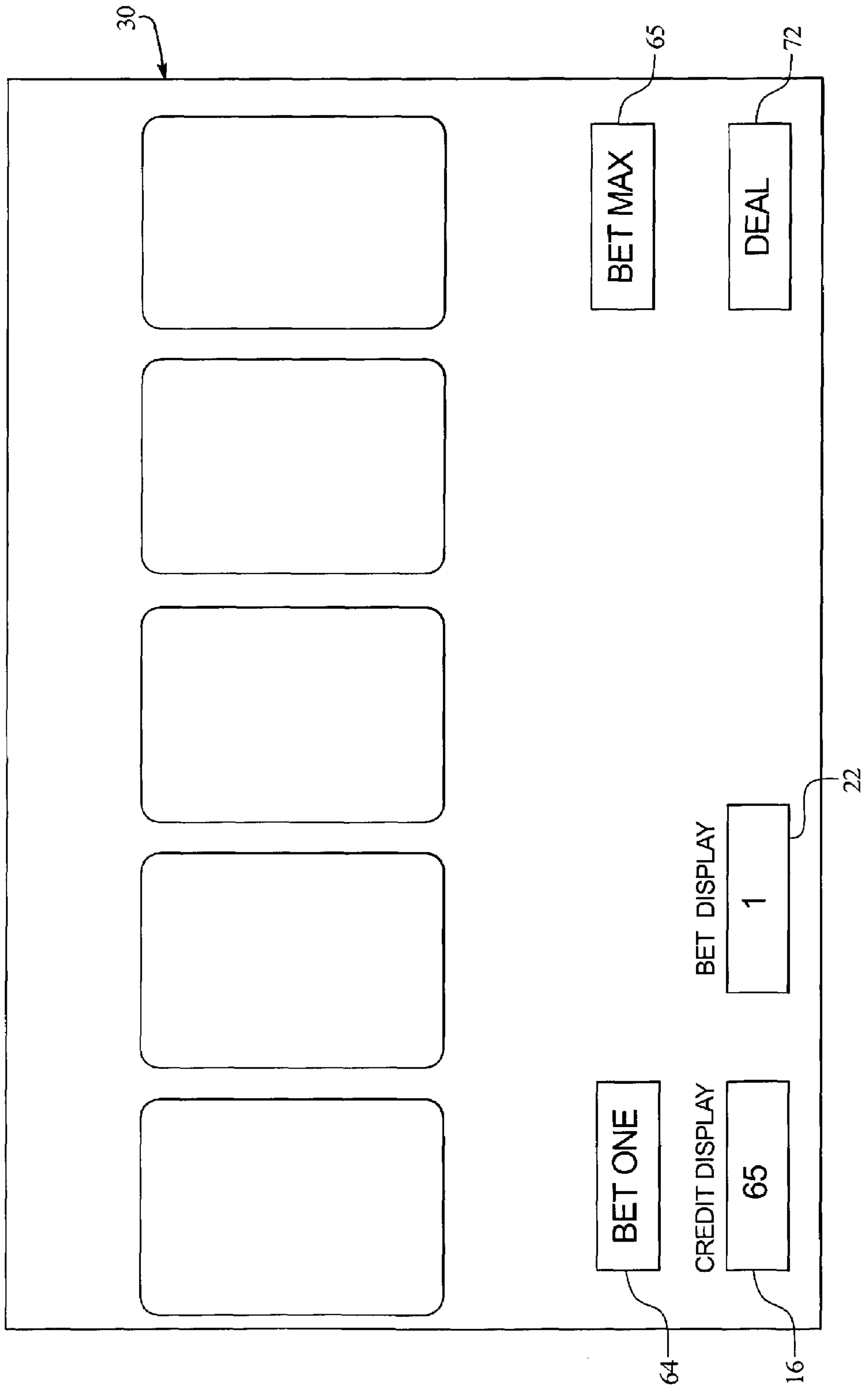

If the player does not accept the discount hands offer, then player resumes normal game play as shown in FIG. 4D. Credit display 16 shows that the player's eight winning credits are added the player's remaining balance. The player can cash out by pressing the cash out button (not shown) or the player can continue to wager any suitable amount on the video poker game.

It should be appreciated in alternative embodiments, the number of discounted hands offered to player does not need to be tied to the card associated with the triggering event. The number of discounted hands may be any predetermined or random number.

Figure 5:
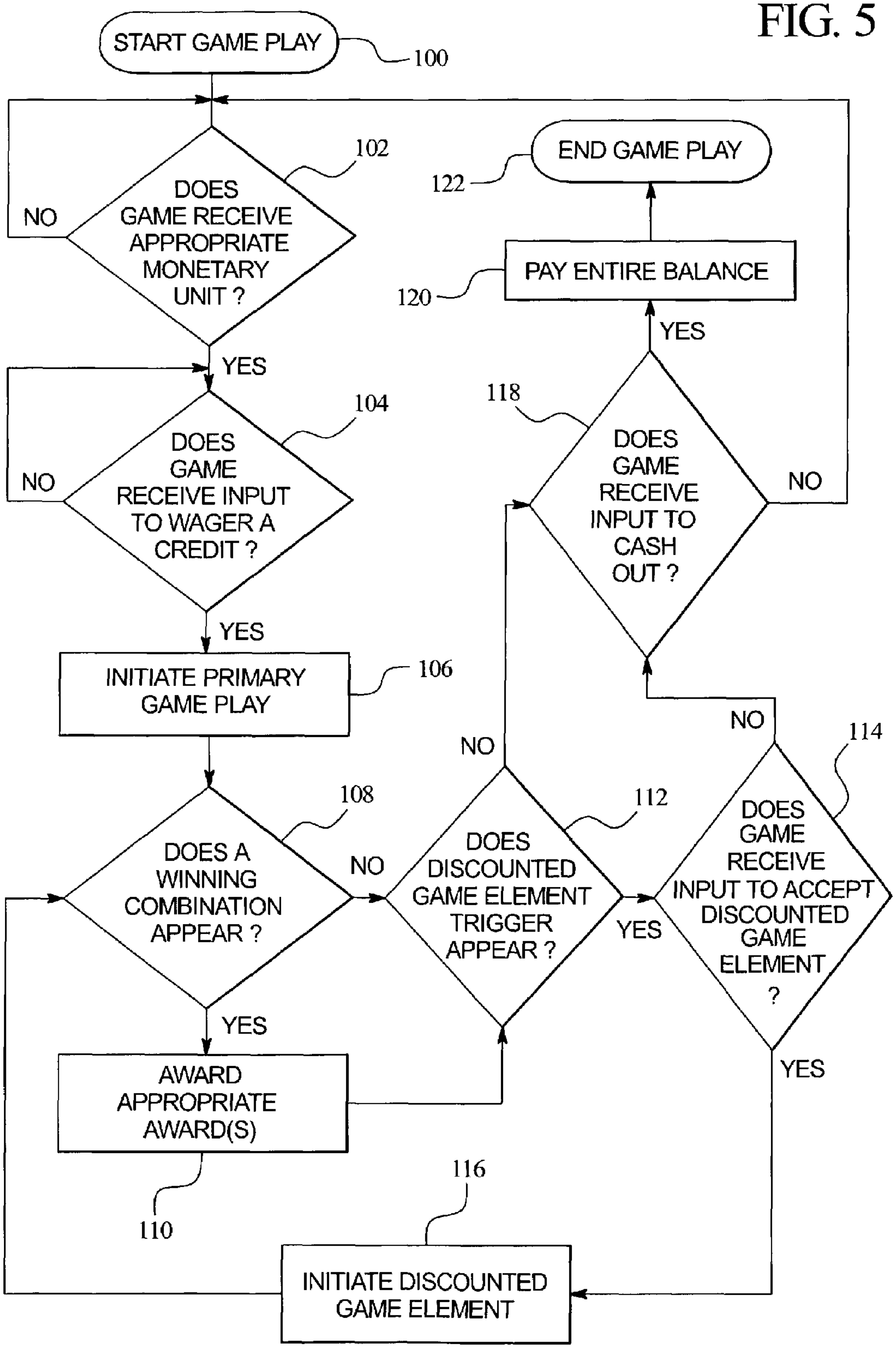
FIG. 5 is a flowchart illustrating an embodiment of a method for operating a gaming device adapted for offering discounted activations or wagers.

Referring now to FIG. 5, a method for operating a gaming device is described. As described above, the gaming device can include any type of primary game. For example, the primary game may be slots, video poker, blackjack, or keno. The method starts at block 100 and continues to decision diamond 102 where a check is made to see if the appropriate monetary unit is received. For example, the gaming device might require one credit for one initiation of the primary game. If the gaming device does not receive the appropriate monetary unit, the decision diamond 102 repeats the check until the appropriate monetary unit is received.

If the appropriate monetary unit is received, a check is made as indicated by decision diamond 104 to see if input is received to wager at least one credit. In this embodiment, one credit is wagered, but it should be noted that any suitable number of credits may be wagered during game play. Furthermore, it should be appreciated that the wagering unit does not have to be a credit. For example, the gaming device might have actual currency amounts as the wagering unit. If input to wager a credit is not received, the decision diamond 104 repeats the check until the input to wager a credit is received.

If the input to wager a credit is received, then the primary game is initiated as indicated by block 106. A check is made to see if a winning combination appears as indicated by decision diamond 108. If a winning combination appears, the player is awarded the appropriate award at indicated at block 110. After awarding the appropriate award to the player, an inquiry is made to see if a discounted game element trigger appears as indicated by decision diamond 112. Alternatively, if a winning combination does not appear, then the discounted game element trigger inquiry is made immediately as indicated by step 112. If the discounted game play trigger appears, then an inquiry is made to see if input to accept the discounted game element is received as indicated by decision diamond 114. The discounted game element trigger in this embodiment is a triggering event as indicated in the above-described embodiments.

If an input accepting the discounted game element is received, then the discounted game element is initiated as indicated by block 116. The discounted game element includes a primary game and any suitable components of the primary game, such as a payline in a slot game or a hand in a poker game.

After the discounted game element is initiated as indicated by block 116, an inquiry is made as to whether any winning combinations have been produced as indicated by the decision diamond 108. The procedure between decision diamond 108 and decision diamond 112 is the same as described above and is therefore omitted. A check will be made again as indicated by decision diamond 112 to see if a discounted game element trigger appears. If the discounted game element trigger does not appear or if the discounted game element is not accepted, then a check will be made as indicated by decision diamond 118 to see if the input to cash out is received.

If the input to cash out is received, then the remaining balance is paid out as indicated by block 120. The remaining balance can be paid by, for example, actual currency or tokens, or the a debit account or a smart card could be credited, or an attendant can be alerted to pay the balance. Once the remaining balance has been paid, game play is ended as indicated by terminator 122. If the input to cash out is not received, then a check is again made as indicated by decision diamond 102 to see if the appropriate monetary unit is received. Thus, game play repeats in the fashion described above.

The triggering event for discounted game play occurs in the primary game of each of the embodiments described above. In alternative embodiments, it should be appreciated that the triggering event may occur in a secondary game such a bonus game. Thus, the player could be offered discounted reinitiations or activations of the primary game while playing a bonus game. Alternatively, the player might be offered discounted game elements in the bonus game, such as discounted paylines or keno cards.

As indicated above, in one alternative embodiment of the present invention, the gaming device provides a plurality of options or offers to the player upon the occurrence of a triggering event. In one example embodiment, upon the occurrence of a triggering event such as a win in a primary game, the gaming device offers the player a value or award such as a plurality of credits to the player or the opportunity to play one or more discounted games. For example, the gaming device could offer the player four-hundred credits or to play ten plays of a nine-line five bet game where the maximum wager is forty-five coins. Thus, the player could take the win of four-hundred credits or could take the discounted games offered to the player in place of the four-hundred credits. If the player accepts the discounted offer, the player receives each game at a discount, but makes or is provided the maximum wager in each game.

In a further alternative embodiment, the triggering event is a predetermined level of wager by the player for the primary game. In one such embodiment, the triggering event could be the player making the maximum wager in the primary game.

The option could be provided on every play of the primary game, on a predetermined number of games per a set of games, randomly determined or otherwise suitably determined. In one embodiment, when the player makes the maximum wager of credits, an amount of credits less than the maximum wager is deducted from the player's credits and the player plays the game with the maximum wager. In another embodiment, the maximum wager is deducted from the player's credit and then the discounted amount of credits is provided or credited back to the player. The processor could cause the display device to display the amount of the discount or amount credited to the player. In one alternative embodiment, the discounted game is provided to the player in a subsequent game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one processor;

at least one display device;

at least one input device; and at least one memory device storing a plurality of instructions, which when executed by the at least one processor, cause the at least one processor to operate with the at least one display device and the at least one input device to:

(a) display a play of a primary game operable upon a first wager, the first wager including a first designated amount of money which is greater than zero, (b) randomly determine an outcome for the play of the primary game, (c) if the randomly determined outcome for the play of the primary game corresponds to a designated triggering outcome, display an offer of at least one discounted game element to a player for at least one subsequent play of the primary game regardless of any wager amounts wagered by the player in any play of the primary game, (d) enable the player to accept the displayed offer of the discounted game element for the at least one subsequent play of the primary game, wherein said acceptance of the displayed offer includes the player making a second wager of a second designated amount of money which is greater than zero, wherein the second designated amount of money is less than the first designated amount of money, and (e) if the displayed offer is accepted by the player, display the discounted game element for the at least one subsequent play of the primary game, wherein any awards in said subsequent play of the primary game are based on a designated wager of a designated amount of money which is greater than the second designated amount of money.

2. The gaming device of claim 1, wherein the discounted game element includes a discounted reinitiation of the primary game.

3. The gaming device of claim 1, wherein the primary game is selected from the group consisting of a slot game, a keno game, a blackjack game and a poker game.

4. The gaming device of claim 1, wherein the discounted game element includes a discounted activation of a component of the primary game.

5. The gaming device of claim 4, wherein the primary game includes a slot game and the component includes a payline.

6. The gaming device of claim 4, wherein the primary game includes a keno game and the component includes a keno card.

7. The gaming device of claim 4, wherein the primary game includes a poker game and the component includes a poker hand.

8. The gaming device of claim 4, wherein the primary game includes a poker game and the component includes a card.

9. The gaming device of claim 4, wherein the primary game includes a blackjack game and the component includes a blackjack hand.

10. The gaming device of claim 4, wherein the primary game includes a blackjack game and the component includes a card.

11. The gaming device of claim 1, wherein said first designated amount of money is wagered on both the primary game and the discounted game element and said second designated amount of money is tendered to accept the discounted game element.

12. The gaming device of claim 1, wherein said first designated amount of money is wagered on the primary game, a third designated amount of money is wagered for the at least one subsequent play of the primary game including the discounted game element, and said second designated amount of money is tendered to accept the discounted game element for the at least one subsequent play of the primary game, wherein the third designated amount of money is less than or greater than the first designated amount of money and the second designated amount of money is less than the third designated amount of money.

13. The gaming device as claimed in claim 1, wherein the processor controls the occurrence of the triggering event.

14. A gaming device having a player-selectable discounted game element, the gaming device comprising:

at least one processor;

at least one display;

at least one input device; and at least one memory device storing a plurality of instructions, which when executed by the at least one processor, cause the at least one processor to operate with the at least one display device and the at least one input device to:

(a) display a play of a primary game operable upon a first wager, the first wager being a first designated amount of money which is greater than zero, (b) randomly determine an outcome for the play of the primary game, (c) if the randomly determined outcome for the play of the primary game corresponds to a designated triggering outcome, display an offer of at least one discounted game element to a player for at least one subsequent play of the primary game regardless of any wager amounts wagered by the player in any play of the primary game, (d) enable the player to accept the displayed offer of the discounted game element for the at least one subsequent play of the primary game, wherein said acceptance of the displayed offer includes the player making a second wager of a second designated amount of money which is greater than zero, and (e) if the displayed offer is accepted by the player, display the at least one subsequent play of the primary game operable upon the first wager of the first designated amount of money and the discounted game element for the at least one subsequent play of the primary game, wherein said first designated amount of money wagered on both the primary game and the discounted game element is less than said second designated amount of money which must be wagered to accept the discounted game element offer and wherein any awards in said subsequent play of the primary game are based on a designated wager of a designated amount of money which is greater than the first designated amount of money.

15. The gaming device of claim 14, wherein the discounted game element includes a discounted reinitiation of the primary game.

16. The gaming device of claim 14, wherein the primary game is selected from the group consisting of a slot game, a keno game, a blackjack game and a poker game.

17. The gaming device of claim 14, wherein the discounted game element includes a discounted activation of a component of the primary game.

18. The gaming device of claim 17, wherein the primary game includes a slot game and the component includes a payline.

19. The gaming device of claim 17, wherein the primary game includes keno and the component includes a keno card.

20. The gaming device of claim 17, wherein the primary game includes a poker game and the component includes a poker hand.

21. The gaming device of claim 17, wherein the primary game includes a poker game and the component includes a card.

22. The gaming device of claim 17, wherein the primary game includes a blackjack game and the component includes a blackjack hand.

23. The gaming device of claim 17, wherein the primary game includes a blackjack game and the component includes a card.

24. A gaming device comprising:

at least one processor;

at least one display device;

at least one input device; and at least one memory device storing a plurality of instructions, which when executed by the at least one processor, cause the at least one processor to operate with the at least one display device and the at least one input device to:

(a) display a play of a primary game operable upon a first wager, the first wager including a first designated amount of money which is greater than zero, (b) randomly determine an outcome for the play of the primary game, (c) if the randomly determined outcome for the play of the primary game corresponds to a designated triggering outcome, display an offer of at least one discounted game element to a player for at least one subsequent play of the primary game regardless of any amounts wagered by the player in any play of the primary game, (d) enable the player to accept the displayed offer of the discounted game element for the at least one subsequent play of the primary game, wherein said acceptance of the displayed offer includes the player making a second wager of a second designated amount of money which is greater than zero, and (e) if the displayed offer is accented by the player, display the at least one subsequent play of the primary game operable upon a third wager of a third designated amount of money and the discounted game element for the at least one subsequent play of the primary game, wherein said first designated amount of money is wagered on the play of the primary game, the third designated amount of money is greater than zero and wagered on the at least one subsequent play of the primary game including the discounted game element, said second designated amount of money is wagered to accept the offer for the discounted game element, and any awards in said subsequent play of the primary game are based on a designated wager of a designated amount of money which is greater than the third designated amount of money.

25. The gaming device of claim 24, wherein the first designated amount of money is equal to the third designated amount of money.

26. The gaming device of claim 24, wherein the third designated amount of money is less than or greater than the first designated amount of money and the second designated amount of money is less than the third designated amount of money.

27. The gaming device of claim 24, wherein the discounted game element includes a discounted reinitiation of the primary game.

28. The gaming device of claim 24, wherein the primary game is selected from the group consisting of a slot game, a keno game, a blackjack game and a poker game.

29. The gaming device of claim 24, wherein the discounted game element includes a discounted activation of a component of the primary game.

30. A gaming device comprising:

at least one processor;

at least one display device;

at least one input device;

at least one memory device storing a plurality of instructions, which when executed by the at least one processor, cause the at least one processor to operate with the at least one display device and the at least one input device to:

(a) display a play of a primary game operable upon a first wager, the first wager including a first designated amount of money which is greater than zero, (b) randomly determine an outcome for the play of the primary game, (c) randomly determine whether to offer at least one discounted game element to a player in association with the play of the primary game, the random determination occurring after the player makes said first wager for the play of the primary game, (d) if the random determination is to offer the discounted game element to the player, display said offer of the discounted game element to the player for at least one subsequent play of the primary game regardless of any wager amounts wagered by the player in any play of the primary game, (e) enable the player to accept the displayed offer of the discounted game element for the at least one subsequent play of the primary game, wherein said acceptance of the displayed offer includes the player making a second wager of a second designated amount of money which is greater than zero, and (f) if the displayed offer is accepted by the player, display the discounted game element for the at least one subsequent play of the primary game, wherein any awards in said subsequent play of the primary game are based on a designated wager of a designated amount of money which is greater than the second designated amount of money.

31. The gaming device of claim 30, wherein the discounted game element includes a discounted activation of a component of the primary game.

32. A gaming device comprising:

at least one processor;

at least one display device;

at least one input device; and at least one memory device storing a plurality of instructions, which when executed by the at least one processor, cause the at least one processor to operate with the at least one display device and the at least one input device to:

(a) display a play of a primary game operable upon a first wager, the first wager including a first designated amount of money which is greater than zero, (b) randomly determine an outcome for the play of the primary game, (c) randomly determine whether to offer the at least one discounted game element to a player, (d) if the random determination is to offer the discounted game element to the player, display said offer to the player in association with the primary game regardless of any wager amounts wagered by the player in any play of the primary game, said offer including a value and the at least one discounted game element for at least one subsequent play of the primary game, (e) enable the player to accept either the value or the discounted game element of the displayed offer for the at least one subsequent play of the primary game, wherein said acceptance includes the player making a second wager of a second designated amount of money which is greater than zero, (f) provide the value to the player if the player accepts the value, and (g) if the discounted game element is accepted by the player, provide the discounted game element to the player for the at least one subsequent play of the primary game, wherein any awards in said subsequent play of the primary game are based on a designated wager of a designated amount of money which is greater than the second designated amount of money.

33. The gaming device of claim 32, wherein the discounted game element includes a discounted activation of a component of the primary game.

34. A method for operating a gaming device, the method comprising:

(a) displaying a play of a first game operable upon a first wager, the first wager including a first designated amount of money which is greater than zero;

(b) randomly determining an outcome for the play of the first game; and (c) if the randomly determined outcome for the play of the first game corresponds to a designated triggering outcome, (i) displaying an offer of at least one discounted game element to a player for a subsequent play of the first game regardless of any wager amounts wagered by the player in any play of the first game; and (ii) displaying the discounted game element for the at least one subsequent play of the first game if the displayed offer is accepted by the player, wherein said acceptance of the displayed offer includes the player making a second wager of a second designated amount of money which is greater than zero, wherein any awards in said subsequent play of the first game are based on a designated wager of a designated amount of money which is greater than the second designated amount of money.

35. The method for operating a gaming device of claim 34, wherein the first game includes a primary game.

36. The method for operating a gaming device of claim 35, wherein the primary game is selected from the group consisting of a slot game, a keno game, a blackjack game and a poker game.

37. The method for operating a gaming device of claim 34, wherein the discounted game element includes a discounted reinitiation of the first game.

38. The method for operating a gaming device of claim 34, wherein the discounted game element includes a discounted activation of a component of the first game.

39. The method for operating a gaming device of claim 34, wherein the first game includes a slot game and the component includes a payline.

40. The method for operating a gaming device of claim 34, wherein the first game includes a keno game and the component includes a keno card.

41. The method for operating a gaming device of claim 34, wherein the first game includes a poker game and the component includes a poker hand.

42. The method for operating a gaming device of claim 34, wherein the first game includes a poker game and the component includes a card.

43. The method for operating a gaming device of claim 34, wherein the first game includes a blackjack game and the component includes a blackjack hand.

44. The method for operating a gaming device of claim 34, wherein the first game includes a blackjack game and the component includes a poker card.

45. The method for operating a gaming device of claim 34, wherein the first designated amount of money is wagered on both the play of the first game and the at least one subsequent play of the first game including the discounted game element and the second designated amount of money is tendered to accept the displayed offer of the discounted game element.

46. The method for operating a gaming device of claim 34, wherein the first designated amount of money is wagered on the play of the first game, a third designated amount of money is wagered on the at least one subsequent play of the first game including the discounted game element, and the second designated amount of money is wagered to accept the displayed offer of the discounted game element, wherein the third designated amount of money is less than or greater than the first designated amount of money and the second designated amount of money is less than the third designated amount of money.

47. The method for operating a gaming device of claim 34, wherein the first game includes a bonus game.

48. The method of claim 34, which includes operating the gaming device through a data network.

49. The method of claim 48, wherein the data network is an internet.

50. A method for operating a gaming device, the method comprising:

(a) displaying a play of a first game operable upon a first wager, the first wager including a first designated amount of money which is greater than zero;

(b) randomly determining an outcome for the play of the first game; and (c) if the randomly determined outcome for the play of the first game corresponds to a designated triggering outcome, (i) displaying an offer of at least one discounted game element to a player for a subsequent play of the first game regardless of: (i) any wager amounts wagered by the player in any play of the first game; and (ii) displaying the discounted game element for the at least one subsequent play of the first game if the displayed offer is accepted by the player, wherein the acceptance includes the player making a second wager of a second designated amount of money which is greater than zero, and wherein the first designated amount of money is wagered on the play of the first game, a third designated amount of money is wagered on the at least one subsequent play of the first game including the discounted game element, the second designated amount of money is wagered to accept the displayed offer, and any awards in said subsequent play of the first game are based on a designated wager of a designated amount of money which is greater than the third designated amount of money.

51. The method for operating a gaming device of claim 50, wherein the first designated amount of money is equal to the third designated amount of money.

52. The method for operating a gaming device of claim 50, wherein the third designated amount of money is less than or greater than the first designated amount of money and the second designated amount of money is less than the third designated amount of money.

53. The method for operating a gaming device of claim 50, wherein the first game includes a primary game.

54. The method for operating a gaming device of claim 50, wherein the discounted game element includes a discounted reinitiation of the first game.

55. The method for operating a gaming device of claim 50, wherein the first game is selected from the group consisting of a slot game, a keno game, a blackjack game and a poker game.

56. The method for operating a gaming device of claim 50, wherein the discounted game element includes a discounted activation of a component of the first game.

57. The method for operating a gaming device of claim 50, wherein the wherein the first game includes a bonus game.

58. The method of claim 50, which includes operating the gaming device through a data network.

59. The method of claim 58, wherein the data network is an internet.

* * * * *

UNITED STATES PATENT AND TRADEMARK OFFICE

CERTIFICATE OF CORRECTION

PATENT NO. : 7,591,726 B2
APPLICATION NO. : 10/227052
DATED : September 22, 2009
INVENTOR(S) : Baerlocher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Twenty-first Day of September, 2010

David J. Kappos
*Director of the United States Patent and Trademark Office*